June 16, 1942.   J. A. MULLER   2,286,922
EXTRUSION MACHINE
Filed April 8, 1939

INVENTOR.
JOHN A. MULLER
BY
ATTORNEYS

Patented June 16, 1942

2,286,922

UNITED STATES PATENT OFFICE 2,286,922

EXTRUSION MACHINE

John A. Muller, Passaic, N. J., assignor to United States Rubber Company, New York, N. Y., a corporation of New Jersey Application April 8, 1939, Serial No. 266,727

1 Claim. (Cl. 18—13)

This invention relates to extrusion machines for forming external covers upon elongated cores or strips of stock being passed therethrough and more particularly it relates to vacuum attachments therefor constructed and arranged to improve the quality of the covered cores or strips of stock formed by said machines.

Much difficulty has been encountered when attempting to use extrusion machines of conventional construction for forming external covers of rubber composition, or like plastic material, about elongated cores or strips of stock since air is often entrapped between the stock and the covering material and subsequently, during processing operations such as vulcanization, expands and causes blisters and weakened areas in the covering material. This greatly impairs the quality of the finished product and renders it unsightly and unsaleable.

My invention provides a machine for extruding covered stock which is substantially free from such blisters and weakened areas. This machine comprises an extrusion head, through which plastic material may be forced to form a cover around an elongated core or strip of stock, and an attachment in a form of a vacuum chamber arranged to evacuate air from the stock as it enters the extrusion head. The vacuum chamber is provided with a seal which serves to admit the stock but at the same time excludes atmospheric air therefrom; so that during operation of the machine a substantial vacuum is constantly maintained. A fine mesh screen is also employed by my vacuum chamber to prevent impurities from being drawn to and interfering with the source of vacuum and to more evenly distribute the vacuum effect over the entire surface of the stock entering the extrusion head. Such a machine readily allows the formation of a uniformly covered stock substantially free from the defects mentioned above.

Figure 1:
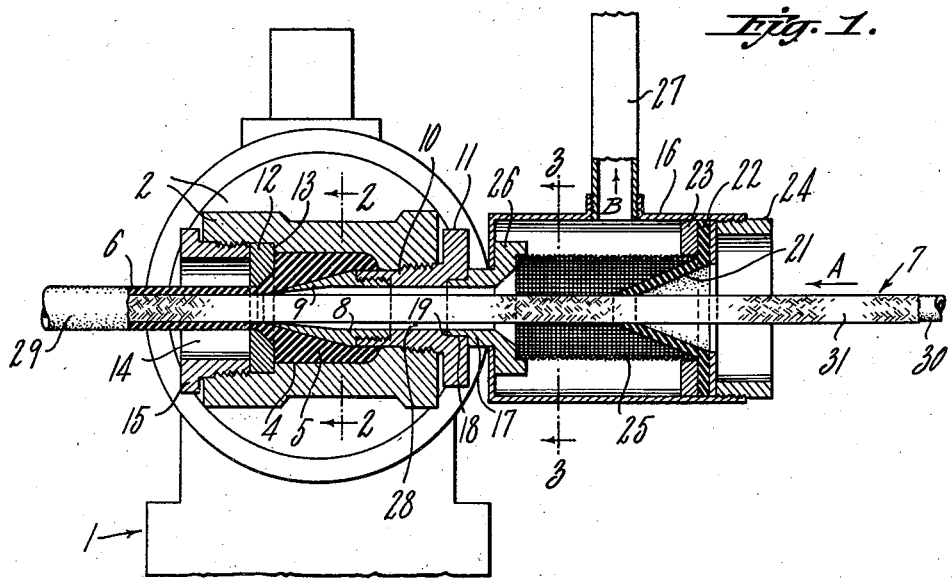
Fig. 1 is a longitudinal, sectional view of an extrusion head showing a vacuum attachment connected thereto.
Figure 2:
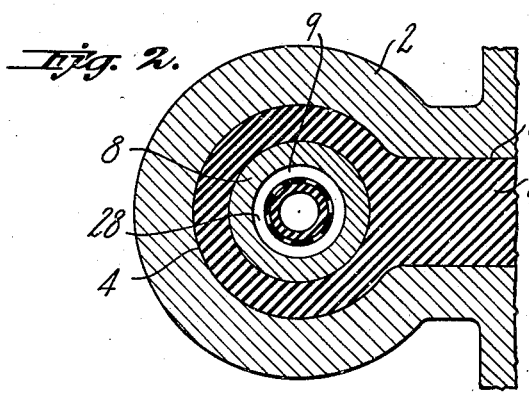
Fig. 2 is an enlarged transverse, sectional view of the extrusion head taken substantially on the section line 2—2 of Fig. 1.
Figure 3:
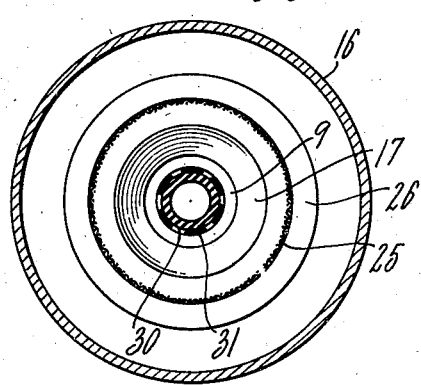
Fig. 3 is an enlarged transverse, sectional view of the vacuum attachment taken substantially on the section line 3—3 of Fig. 1.
Figure 4:
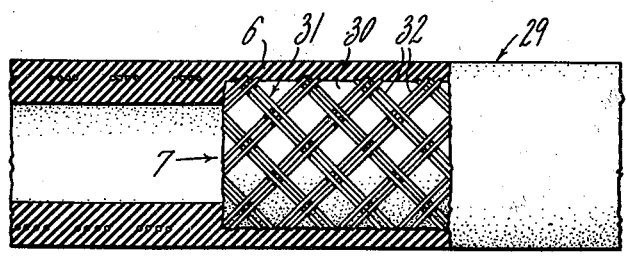
Fig. 4 is a detail view, partly in section and partly broken away, showing a covered hose which may be formed by my extrusion machine and vacuum attachment.

Referring to the drawing and more particularly to Figs. 1 and 2, the reference numeral 1 indicates generally an extrusion machine which is arranged with a hollow extrusion head 2 extending therefrom. A channel 3 is formed in this head and communicates with a work or pressure chamber 4 and serves to confine and guide the plastic rubber composition 5 being forced into the chamber for forming a cover 6 upon an elongated core of stock 7. The core 7, moving in the direction indicated by the arrow A, passes longitudinally through the pressure chamber 4 of the extrusion head 2 and is centrally positioned therewithin by a guiding die 8 which has an inwardly tapered guiding edge 9 conforming substantially to the size and shape of the stock passing through the machine. However, the size and shape of the guiding edge 9 may be varied according to the particular characteristics of the stock being covered by the machine. The guiding die 8 is detachably carried at the inner end of a hollow bushing 10 by threaded engagement therewith. The bushing 10 is in turn threaded into the intake end of the extrusion head 2 so that it may be firmly but removably secured in position therein. The hollow bushing 10 is provided with an external flange 11 so that the bushing may be easily gripped and the bushing and die 8 removed as a unit from the extrusion head for replacement purposes.

An extrusion die 12 for forming the outer surface of the cover 6 is located within the extrusion head 2 and at the opposite end from the bushing 10. The extrusion die 12 engages a circumferential shoulder 13 formed in the inner wall of the pressure chamber 4 and is held in place thereagainst by a second hollow bushing 14 threaded into the extrusion head and into engagement with the die 12. The bushing 14 holds the extrusion die firmly but removably against the shoulder 13 and in axial alignment with the guiding die 8 and bushing 10. The hollow bushing 14 is also formed with an external flange 15 so that this bushing may also be removed when it is desired to replace the extrusion die 12 by a die of different internal size or shape.

A cylindrical vacuum chamber 16 is rigidly but detachably secured to the hollow bushing 10 in the extrusion head 2 by means of an elongated collar 17 attached to and extending from an end wall of the vacuum chamber 16. The collar 17 is provided with a longitudinally extending circumferential flange 18 adapted to fit snugly within a recess 19 formed in the hollow bushing 10. This flange 18 may be secured in place therein in any well known manner so long as a substantially air-tight joint is formed between members 10 and 17. The vacuum chamber 16 is provided at its intake end with a conical, flexible seal 21 of air impervious material, such as rubber or leather, and is provided with a central aperture through which the core 7 may pass. The seal is arranged to fit closely about the stock passing through the vacuum chamber so that air from the atmosphere is substantially prevented from entering the vacuum chamber during operation of the machine. The seal 21 has a circumferentially extending flange 22 which is securely clamped in position between an internal ring 23 secured to an inner wall of the chamber 16 and an outer removable collar 24 threaded into the intake end of the vacuum chamber 16. Under ordinary operating conditions, it is possible to obtain a vacuum as high as 27 inches of mercury in the vacuum chamber 16 when using the seal 21. However, should it be desired to increase this sealing effect a plurality of such members may be clamped together between the ring 23 and the collar 24.

A cylindrical screen 25, of substantially fine mesh, is concentrically positioned within the chamber 16. One end of the screen 25 is held in place within a circumferential flange 26 formed upon the inner end of the collar 17 and the opposite end of this screen fits within the ring 23 and is held in place by engagement with the inner wall of the seal 21.

A suction pipe 27 is attached to the vacuum chamber 16 and communicates with a suction pump or equivalent source of vacuum (not shown) of any conventional construction. Any air that may be present or enter the chamber 16 during operation of my machine is drawn, as indicated by the arrow B, into the pipe 27 and to the vacuum source and is expelled thereby. The hollow construction of the guiding die 8, the bushing 10 and the collar 17 forms a passageway 28 which is somewhat larger than the core of stock 7 extending therethrough. This passageway communicates with the chamber 16 so that a vacuum is maintained about the core 7 until the plastic covering material 5 is applied thereto.

I have shown, by way of illustration, a product in the form of a tubular hose 29 which may be readily formed by my extrusion machine and vacuum attachment. As will be seen from parts in section and parts broken away, the hose 29 is formed of the external cover 6 of rubber composition and the inner core of stock 7. The core 7 comprises a flexible tubing 30 of rubber composition and a reinforcing sheath 31 of interlaced cotton strands 32 braided thereon. Innumerable voids and pockets are present between and beneath these strands forming the sheath and it will be apparent that if air is allowed to remain therein it would be difficult to form a plastic cover uniformly upon such a core by a conventional extrusion machine without entrapping air between the core and the cover. This enclosed air would subsequently swell during vulcanization and destroy adhesion between the cover and the core, and form objectionable blisters and defects.

However, when air is evacuated by my vacuum attachment operating in conjunction with the extrusion machine, the plastic rubber composition forming the cover may be forced into these voids and completely around the individual strands of the sheath without resistance from entrapped and compressed air. As the hose 29 or similar covered stock leaves the extrusion machine atmospheric pressure also tends to force and hold the outer cover 6 more firmly into engagement with the sheath 31 and tubing 30.

When this reinforced hose 29 is subsequently subjected to processing operations, such as vulcanizing heat, the absence of air between the cover 6 and the core 7 permits the production of a finished product which is substantially uniform and free from defects throughout its entire length.

During operation of my extrusion machine and vacuum attachment, a vacuum is created in the vacuum pipe 27, the vacuum chamber 16, and the passageway 28 by a vacuum pump or its equivalent and at the same time rubber composition 5 is forced into a channel 3 and pressure chamber 4 and between the dies 8 and 12. As this occurs the elongated core of stock 7 is caused to move through the vacuum chamber and guiding die 8 and progressively comes into contact with the rubber composition of the chamber 4. Any air that might have been present about the core 7 moving into the chamber or that has leaked in from the atmosphere is evacuated by the vacuum attachment, and as the core continues to progress through the extrusion head a uniform cover is forced about and firmly into adhesion with all portions of the core. Since substantially no air has been allowed to remain about the core being covered, the possibility of subsequent blisters between the cover and core have been materially reduced. A uniformly covered product can thus be easily and readily formed by my extrusion machine and vacuum attachment.

Although the invention has been described in connection with the specific details of a preferred embodiment thereof, it must be understood that such details are not intended to be limitive of the invention except in so far as is set forth in the accompanying claim.

Having thus described my invention, what I claim and desire to protect by Letters Patent is:

An extrusion machine having an extrusion head and die means adapted to form a cover of plastic composition about the external surface of material passing therethrough, a suction chamber and a source of vacuum operatively associated with said extrusion head for removing a gaseous medium from the external surface of the material being covered by said plastic composition, said suction chamber including flexible apertured removable sealing means having a tapered tubular portion through which the material is passed before entering the extrusion head, and a tubular screen of relatively fine mesh operatively interposed between said material and said source of vacuum, said tapered tubular portion being of such size as to fit into an end of said tubular screen and removably retain same in operative position.

JOHN A. MULLER.